June 2, 1925.  
J. E. ARAVE  
FLUID POWER TRANSMISSION  
Filed Jan. 24, 1924  
1,540,453

Inventor  
J. E. Arave  
by Hazard and Miller  
Att'ys

Patented June 2, 1925.

1,540,453

UNITED STATES PATENT OFFICE.

JOSEPH E. ARAVE, OF LOS ANGELES, CALIFORNIA.

FLUID-POWER TRANSMISSION.

Application filed January 24, 1924. Serial No. 688,131.

*To all whom it may concern:*

Be it known that I, JOSEPH E. ARAVE, a citizen of the United States, residing at Los Angeles, in the county of Los Angeles and State of California, have invented new and useful Improvements in Fluid-Power Transmission, of which the following is a specification.

My invention relates to fluid power transmission, and consists of the novel features herein shown, described and claimed.

My object is to make an elastic connection between a driving shaft and a driven shaft.

Figure 1:
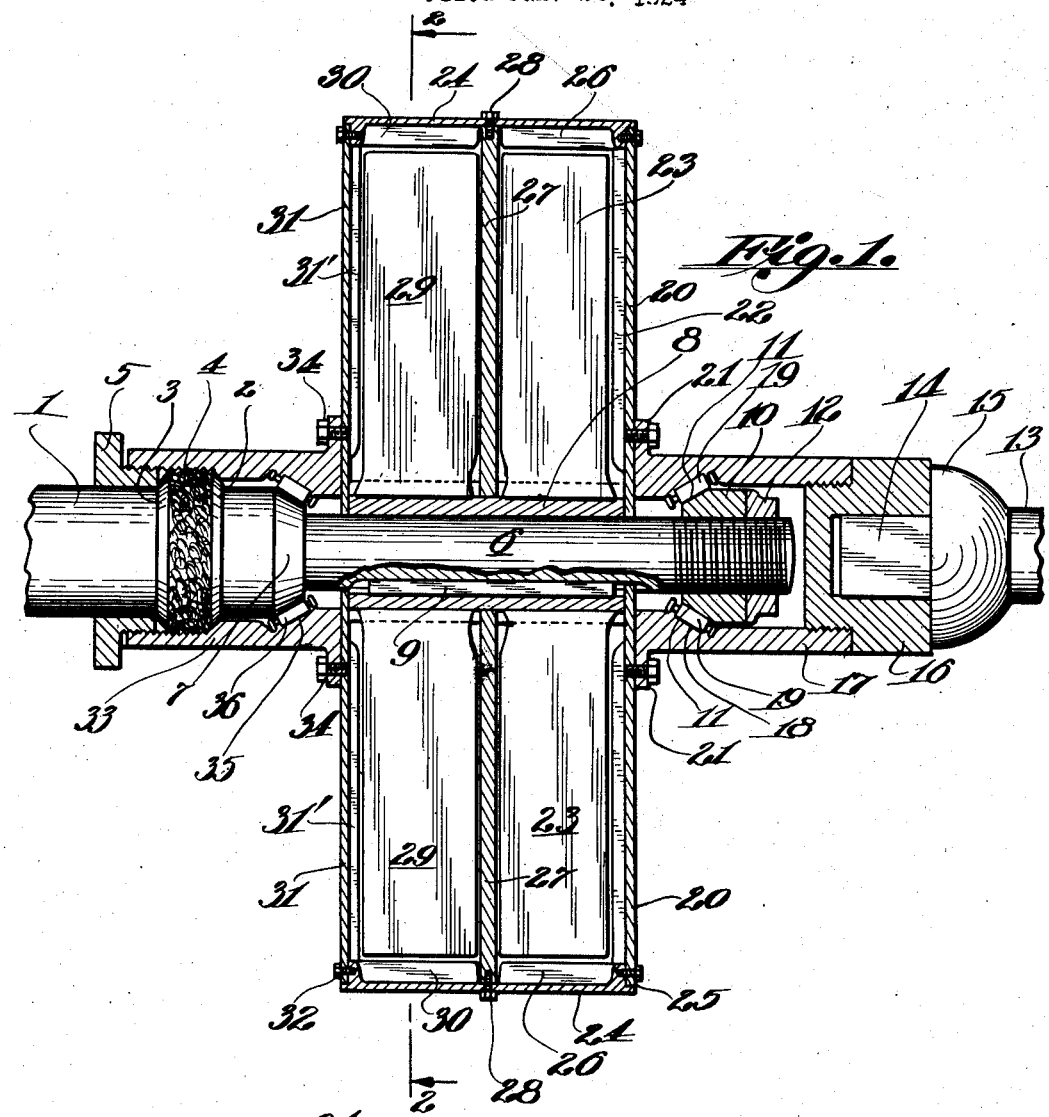
Figure 1 is a diametrical sectional detail showing a driving shaft and a driven shaft connected by a fluid transmission in accordance with the principles of my invention.
Figure 2:
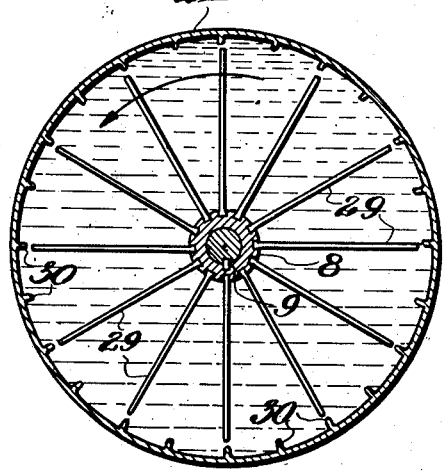
Figure 2 is a cross section on the line 2—2 of Figure 1.

The driving shaft 1 has packing rings 2 and 3 slidingly mounted on the shaft 1, said packing rings being A-shaped in cross section, and packing 4 is placed between the rings 2 and 3. The stuffing box gland 5 is slidingly mounted on the shaft 1 against packing ring 3. The shaft 1 is reduced in size to form the portion 6, there being a bevelled shoulder 7 between the portion 6 and the main portion of the shaft.

The hub 8 fits upon the portion 6, and is held by a key 9. The extreme end of the portion 6 is screw-threaded, and a bevelled collar 10 is screwed on to the portion 6 and has a roller bearing seat 11. A jamb nut 12 is screwed on to the shaft against the collar 10. The driven shaft 13 has a squared end 14 and a shoulder 15. The squared end 14 fits in a socket member 16, and the socket member 16 is screwed into the end of a bearing sleeve 17 having a roller bearing seat 18 and rollers 19 are mounted between the seats 11 and 18.

A disc 20 fits closely around the portion 6 of the driving shaft against the end of the hub 8, and is secured to the sleeve 17 by flanges and bolts 21. Radial ribs 22 are formed upon the inner face of the disc 20. Radial blades 23 have their inner ends dovetailed into the hub 8 and fit closely against the ribs 22, there being space enough between the blades and ribs to allow the blades to run freely past the ribs.

A ring 24 is connected to the disc 20 by flanges and bolts 25, said ring having inwardly projecting ribs 26, the inner edges of the ribs 26 being slightly spaced from the outer ends of the blades 23.

An annular partition 27 is inserted into ring 24 and secured in place by cap screws 28, said partition 27 being slightly spaced from the blades 23. Blades 29 are dovetailed to the hub 8 and are slightly spaced from the partition 27 and are slightly spaced from the ribs 30 extending inwardly from the ring 24.

A disc 31 fits against the opposite end of the hub 8 from the disc 20, and is connected to the ring 24 by bolts and flanges 32, and has radial ribs 31' extending from its inner face and slightly spaced from the blades 29. A bearing member 33 is secured to the disc 31 by flanges and bolts 34, and has a roller bearing seat 35 and rollers 36 fit between the seats 7 and 35. The outer part of the bearing member 33 is enlarged to fit over the packing rings 2 and 3, and is internally screw-threaded. And the stuffing box gland 5 is screwed into this bearing member 33 against the packing ring 3 to compress the packing 4.

The entire chamber between the member 16 and the packing 4 and between the blades and inside of the disc 20, the ring 24 and the disc 31 is filled with oil, so that as the driving shaft 21 is operated the resistance of the oil will impart power to the driven shaft 13, and this oil makes an elastic connection between the driving shaft and the driven shaft so that when the driving shaft is started the driven shaft will pick up as fast, or nearly as fast, as the driving shaft.

The hub 8 and the radial plates 23 and 29, mounted upon the hub, are carried by the driving shaft 1 and the disc 20, the ring 24, the disc 31, the bearing member 17 and the bearing member 33, constitute a resistance housing carried by the driven shaft, the housing being closed at one end by the socket member 16 and at the other end by the stuffing box carrying the packing 4.

Thus I have produced a fluid power transmission, comprising the combination with a driving shaft and a driven shaft mounted in a line, of radial blades fixed upon the driving shaft, a resistance housing fixed upon the driven shaft and enclosing the radial blades, a stuffing box upon the driving shaft and carried by the housing, thus forming a chamber, and a fluid in the chamber.

Various changes may be made without departing from the spirit of my invention as claimed.

I claim:

1. A fluid power transmission comprising the combination with a driving and a driven shaft, a resistance housing mounted upon the driven shaft, said housing consisting of a closed cylinder, radial ribs formed on all of the interior surfaces of said closed cylinder, and a partition secured within said cylinder and dividing it into two compartments, two sets of radial blades secured to said driving shaft, each set being adapted to rotate within one of said compartments, and fluid in said compartments.

2. A fluid power transmission comprising the combination with a driving and a driven shaft, a resistance housing mounted upon the driven shaft, a plurality of compartments within said housing, a plurality of sets of radial blades secured upon the driving shaft, each of said sets being adapted to rotate within one of said compartments, radial ribs formed upon the interior surfaces of each of said compartments adjacent the side edges of said radial blades, and radial ribs formed upon the interior surfaces of each of said compartments adjacent the end edges of said radial blades, and fluid in said compartments.

In testimony whereof I have signed my name to this specification.

JOSEPH E. ARAVE.